Nov. 4, 1958  J. MULLER  2,858,843
RESERVOIR WITH FLOATING CONDUIT
Filed Dec. 16, 1955  5 Sheets-Sheet 1

INVENTOR
JACQUES MULLER
BY *Young, Emery & Thompson*
ATTORNEYS

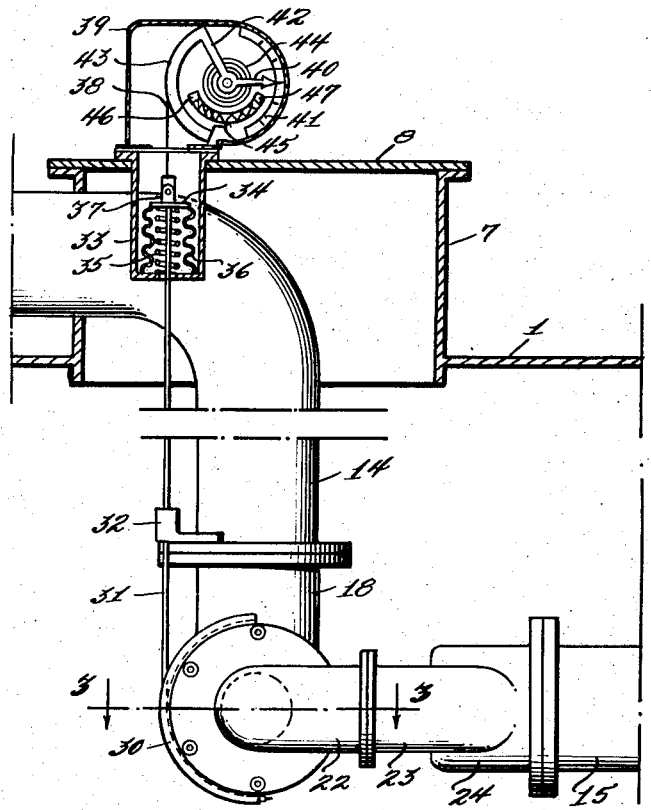

Nov. 4, 1958  J. MULLER  2,858,843
RESERVOIR WITH FLOATING CONDUIT
Filed Dec. 16, 1955  5 Sheets-Sheet 3

INVENTOR
JACQUES MULLER

BY *Young, Emery & Thompson*

ATTORNEYS

Nov. 4, 1958  J. MULLER  2,858,843
RESERVOIR WITH FLOATING CONDUIT
Filed Dec. 16, 1955  5 Sheets-Sheet 4

INVENTOR
JACQUES MULLER

BY *Young, Emery & Thompson*

ATTORNEYS

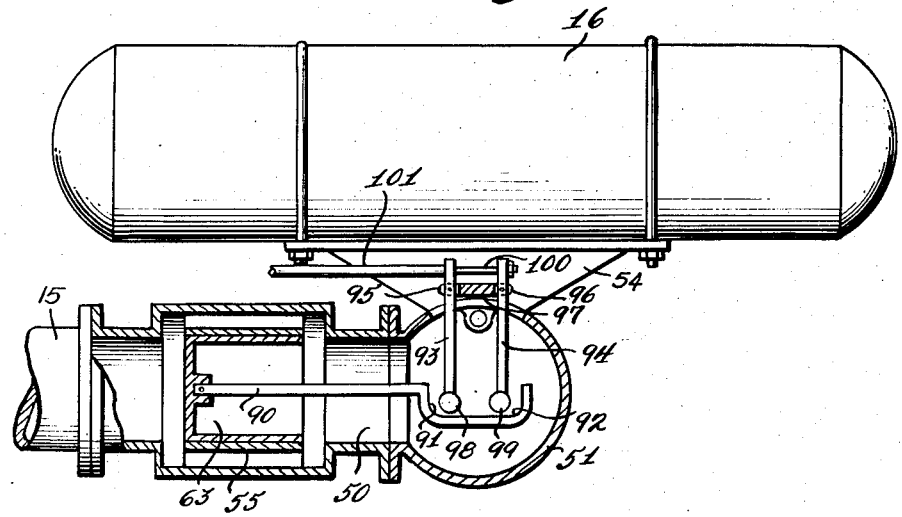

United States Patent Office 2,858,843
Patented Nov. 4, 1958

2,858,843

RESERVOIR WITH FLOATING CONDUIT

Jacques Muller, La Garenne-Colombes, France

Application December 16, 1955, Serial No. 553,608

Claims priority, application France December 16, 1954

11 Claims. (Cl. 137—172)

This invention relates to tanks for storing liquids of many kinds, which tanks may be fixed or movable, such as fuel tanks installed in a fixed location and the fuel tanks of aircraft.

The liquid is introduced or withdrawn from such tanks by pumping. Since it undergoes a decantation or stratification in which impurities are separated in the tank it is important in the filling and discharging operations to avoid remixing the impurities which separate with the decanted liquid. For this reason such fuel tanks always contain a certain amount of water due to condensation and the solid impurities accidently introduced therein which separate by gravity and form a layer at the bottom of the tank. In order to withdraw the fuel in a state as pure as possible it has been proposed to use as a withdrawal tube, an articulated or pivoted pipe comprising a fixed part or column and at the end of this fixed part substantially in the longitudinal axis of the tank there is a pipe articulated or pivoted to the column and ending in a float or a floating arm. Thus the fuel is withdrawn near its free surface in the part of the liquid volume which is the first to be decanted.

In the constructions heretofore known, the floating arm was attached below a float of spherical shape, this being the shape which provides the maximum volume and consequently the greatest buoyancy for a given weight. However, the diameter of the float is limited by the diameter of the manhole which must be provided in larger tanks for the insertion of the equipment inside the tank, so that the buoyancy force is necessarily small. It has been proposed to simplify this equipment as much as possible so as to reduce the weight of the float arm to the minimum. The float arm is generally a simple tube connected to the column by means of an elbow with a pivoted joint and it is used only for discharge from the tank. For filling, the tank comprises a vertical tube discharging near the bottom. In spite of the proposed use of a horizontal baffle in front of the discharge end of this tube this means of introducing the fuel produces eddies of liquid near the bottom. Furthermore, it does not take into consideration possible variations of the level of the water in the bottom of the tank.

An object of this invention is to provide a floating arm and associated equipment of such construction and operating in such a manner as to serve for both a withdrawal conduit and a filling conduit.

Another object is to provide a float mechanism capable of exerting a large upward force and various means utilizing this property for ensuring that the floating arm will have a robust construction and will be able to control a proper supply of liquid by its movement of oscillation.

A further object of the invention is to provide means which under the control of the float will ensure a complete closure of the tube or duct in the arm at the high point so as to arrest any surging back of liquid when the tank is full, and also to ensure withdrawal at the low point when the tank is nearly empty.

A still further object of the invention is to provide means which in spite of the closure of the tube or duct in the floating arm at the high point in the course of filling the tank will enable on one hand the assurance of a complete filling particularly in the case of a movable tank such as the fuel tank of an aircraft and on the other hand, the discharge to be started in spite of the closing of the tube or duct in the arm effected at the high point by the action of the float.

Yet another object of the invention is to provide means which in spite of the closing of the tube or duct in the floating arm effected at the low point for the end of discharge by the action of the float will permit the pumping of liquid into the tank so as to obtain by a rise of the level the reopening of the arm to effect filling.

Still another object of the invention is to provide a safety means responsive to the difference in density of two liquids which in the course of discharge will determine the closure of the conduit of the floating arm before this latter enters the underlying layer of liquid, The invention will be described hereinafter in various embodiments of a tank with a floating arm as illustrated in the accompanying drawings, in which, Figure 1 is a diagrammatic view in longitudinal section of a tank equipped with a floating arm according to the invention;

Figure 2 is a partial longitudinal sectional view of the tank taken through a tube forming a manhole and shows in elevation the column to the lower end of which the floating arm is connected, as well as the connection and a device for transmitting the movements of the arm;

Figure 3 is a partial horizontal sectional view taken on line III—III of Figure 2 showing the elements of the pivoted connection;

Figure 8 is a view corresponding to Figure 4 of another embodiment of the members associated with the arm;

Figure 9 is an axial sectional view of the bottom of the fixed column and its pivoted connection joint, and shows another embodiment of the elements connected to the arm.

Figure 1:
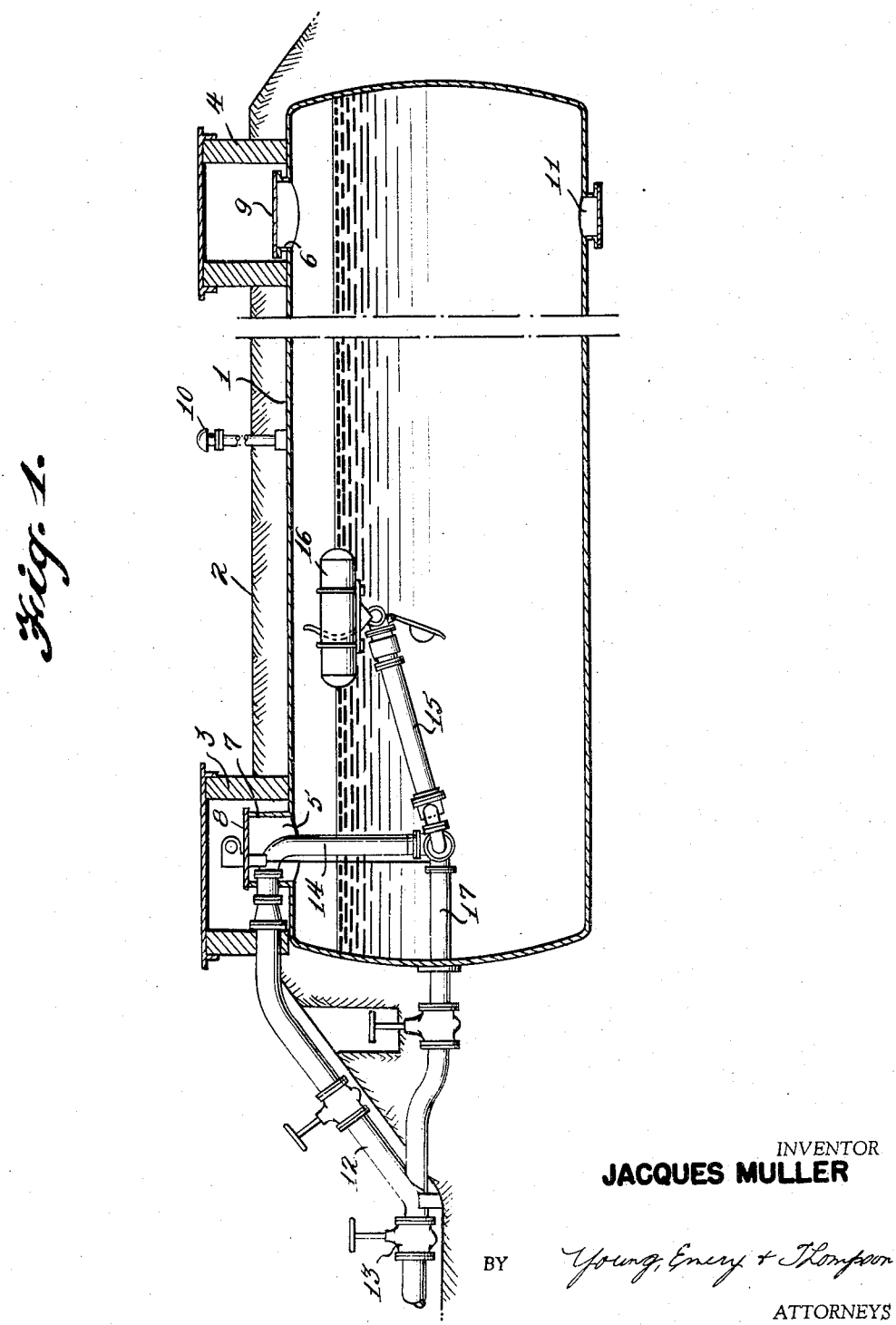

A tank for a fixed location, shown for example in Figure 1, comprises a sheet metal container 1 of large diameter and great length. It may be buried under an embankment 2 and it is accessible adjacent its ends by means of two access wells 3 and 4 which are normally covered and which protect manholes 5 and 6. The manhole 5 is defined by a tube 7; and both manholes are closed by covers 8 and 9. Between them the tank is provided with a ventilation stack 10 and the tank is provided at its low point with a cleaning opening 11, normally closed. A conduit 12 connects the tank to a pump (not shown) through a shutoff valve 13.

The conduit 12 terminates at the tube 7 and it traverses tube 7 by means of an elbow to which is connected a fixed vertical tubular column 14 extending to a level at the axis of the tank. At the bottom of this column 14 there is pivotally connected a tube forming a continuation of conduit 12 and which is in the form of a floating arm 15, terminating at its end and supported by floats 16. If desired the conduit 12 may enter directly axially of a cylindrical tank body and terminate as an axial horizontal tube 17 replacing the column 14. The floating arm 15 would then be articulated to the end of this tube 17. The conduit 12 and the fixed tube 14 or 17 with its floating arm 15 thus constitutes a conduit serving both for filling and emptying the tank. Means will now be described for actuating this floating arm.

As shown in Figures 2 and 3 the pivoted joint is made not by a simple elbow of a known construction but by means of a Y which will ensure a symmetrical attachment relative to to a vertical plane of oscillation of the floating arm. A T-fitting 18 is furnished at the lower end of the column 14. It has symmetric lateral flanges 19 each of which has centered and fixed thereon a sleeve 20 serving as a fixed pivot for a rotary sleeve 21. The two symmetrical rotary sleeves 21 are connected to similar elbows 22 connecting said sleeves to branches 23 of the Y connecting tube 24 to which is connected the tube 15 of the floating arm.

The rotary sleeves 21 are carried on the fixed sleeves 20, each by means of a ring of balls 25 adapted to act as thrust bearings. The sleeves are spaced by means of a difference of radius just sufficient to provide free play and the balls are engaged partly in opposite grooves which constitute ball races in said sleeves. Thus they are fixed exactly relative to the axial positions of said sleeves. A radial hole 26 in each sleeve 21 makes it possible to introduce the balls successively so that the ball bearing can be assembled to ensure the axial fixing of the rotary sleeves 21 on the fixed sleeves 20. The hole 26 is closed by a plug 27. On each side of the ball bearing there is provided packing devices 28 and 29 which protect it from liquid and seal the conduit from the outside.

On one of the rotary sleeves 21 is fixed a segment of a grooved pulley 30. At the lower end of the pulley 30 is attached a cable 31 lying in the groove and passing vertically up along the column 14. This cable passes through a guide 32 fixed to the upper flange of the T-fitting 18. It passes through an opening in the bottom of a pot-like chamber 33 carried by the cover 8 of the manhole 7 and is attached to a plate 34 supported by a spring 35 which rests on the bottom of the pot 33. A bellows 36 is fixed and sealed to the bottom of pot 33 and to the plate 34 to prevent the atmosphere in the system having any communication with the external atmosphere through the hole through which the cable enters the pot 33. The plate 34 carries a fitting 37 to which there is articulated a fastening member attached to a cable 38 which operates as an indicator. The casing 19 of the indicator is flangedly connected on the pot 33. The indicator has a needle 40 which moves over a scale 41 graduated in levels or in volumes. The needle has an arm 42 which carries a segment 43 over which the cable 38 passes. A spring 44 maintains tension of the cable. The segment 43 is fixed to the needle and can serve as an electric contact element for the operation of the pumps by means of a relay. There is shown diagrammatically a contactor 45 which at the end of its movement comes into contact with contact studs 46, 47 to close the circuit of a relay operating a pump device for filling or emptying the tank.

The floating arm 15 pivotally connected to the bottom of the column 14 is securely held in a vertical plane passing through the axis of the tank and the joint or pivotal connection is subjected to symmetrical forces assuring its correct operation. When the arm descends as a result of the lowering of the level of the fuel in the tank, the cable 31 unwind from the segment 30, the plate 34 moves upwards under the thrust of the spring 35 and the needle 40 turns in a clockwise direction. Inversely when the arm rises the cable 31 exerts a traction on the plate 34 and turns the needle in a counter-clockwise direction toward the graduations denoting increasing volumes or levels of liquid in the tank.

At the end of the tube 15 of the floating arm (Figs. 4-6) there is connected by flanges a tube 48 having an enlargement 49 containing a valve. On the end flange of tube 48 there is connected by a flange the central branch 50 of a T-fitting the cross-piece 51 of which is a symmetrical horizontal tube (see Figure 5) terminating at its ends on opposite sides of the mean plane of oscillation. Two symmetrical bosses 52 of this tube support a rod 53 on the projecting ends of which are pivoted plate members 54 to which the floats 16 are clamped. The floats may be of any suitable shape, for example cylindrical, but of large volume. The diameter is limited only by that of the manhole of the tank and the length may be several times said diameter.

Owing to their symmetrical arrangement the resulting lifting force is located in the median plane of oscillation. The pivoting about the axis of transverse rod 53 enables these floats always to remain horizontal, and therefore parallel to the level of the liquid while the floating arm oscillates vertically.

The floats 16 may be hollow bodies of metal or preferably of a neutral and non-corroding synthetic material such as a glass fiber fabric impregnated with synethetic resin of the type commercially known as laminated glass fiber. The floats may also be solid bodies of any light material such as plastic foam material like that known under the trade name of "Klegesel." Moreover, the tubes extending into the tank are not necessarily of metal but may be also made of a suitable plastic material.

The chamber formed by the enlargement 49 of the tube 48 at the end of the floating arm 15 is divided by an annular wall 55 extending through the middle portion of the length of the chamber, the wall 55 being open at its ends and is held by radial ribs 56, into an axial chamber and into a peripheral passage made up of the channels formed between the ribs 56. The upper wall of the enlargement 49 between two ribs 56 is provided with a short vertical tube 57 communicating with one of the peripheral channels. On this tube 57 is connected by a flange, a valve housing 58, the walls of which are perforated by holes 59. The housing has an internal seat for the head 60 of a discharge valve urged on its seat by a spring 61. This valve has a vertical stem 62 guided in a boss on the top of the housing and projecting upwardly.

In the cylinder 55 there is slidably mounted a piston valve 63 of the same length which is provided with a head facing the outer end of the tube 15 and a skirt which closes the communication between the peripheral passages and the end of the tube 48 when the piston valve is moved up to this end. The movement of the piston valve is effected by mechanism as follows.

On a transverse wrist pin 64 mid-length of the piston valve mounted in two internal bosses 65 of the latter there is pivotally connected a connecting rod 66 centered with slight play between two bosses 67. In the end fitting 68 of this connecting rod there is pivoted the upper arm of a bell crank lever 69 which passes through a slot in the lower wall of the central branch 50 of the T-fitting and is pivotally connected to a fitting 70 carried by the wall of the T-fitting. The lower arm of this bell crank lever has a rounded end portion or heel 71 and carries counterweight 72 which maintains this arm normally in the position shown in solid lines in which the piston valve 63 is located inside its cylinder. Around the upper arm of this counterweighted lever is positioned a free sliding plate 73 shifted by the movement of the aforesaid upper arm to maintain the slot through which the arm extends closed.

The upper wall of the tube 51 has a slot and an external fitting 74 similar to the slot and fitting 70 in the lower wall. To the fitting 74 is pivoted a lever 75 having one arm directed downwardly and provided at its lower end with a pin 76 which abuts against the upper end of the counterweighted lever 69. The lever 75 has another arm directed upwardly and bent, and which terminates in a rounded portion or heel 77. At the bend, lever 75 carries a small plate 78 which bears on the stem 62 of the discharge valve when the lever turns in a counter-clockwise direction.

The head of the piston valve 63 has an opening 79 normally closed by a one-way by-pass valve 80 under the thrust of a spring 81. The latter abuts against a bridge member 82 fixed to the head of the piston and serving as a guide for the stem 83 of the said by-pass valve 80. It is obvious that this valve forms a means for overflow discharge when the limit of filling of the tank is attained.

When the floating arm oscillates vertically due to variations of level of the fuel in the tank, the tube 51 moves up or down while remaining horizontal and at a small distance below the free surface. The ends of tube 51 are directed horizontally and symmetrically during intake as in delivery the zone of movement of the fuel being always near the surface.

Furthermore, the platforms of pivoted clamping members 54 of the floats form above the ends of tube 51 baffles which are always horizontal and prevent formation of eddies which may entrain air by the draw-in liquid. During discharge, inflow takes place within a mass of pure fuel even if the tank is filled within a short time because the surface liquid is the first to undergo decantation. During filling the liquid being introduced in a horizontal plane near the surface any eddies formed do not affect the bottom of the tank and cannot remix the sludge there with the decanted fuel.

When the floating arm 15 in following the variations of level of the fuel, arrives near the lower wall of the tank during emptying, or near the upper wall of the tank during filling the levers 69 and 75 are the first to encounter said walls.

In the first case the heel 71 of the lever 69 slides on the lower wall and the floating arm moves down further while the lever 69 turns clockwise and exerts through the link or connecting rod 66 a pull on the piston valve 63. At the limit when by reference to the arm the lower wall is in the position 1A, the floats will be in position 16A and the lever 69 in position 69A. At this time the piston valve 63 occupies its extreme position (shown in broken lines) in which it engages the stop 84. The piston then closes the extreme end of tube 48 of the floating arm. In this position of the piston valve the pump cannot suck in more fuel and the floating arm is arrested in its lowermost limited position in which the intake ends are still above the lower layer of water and sludge. This position is not necessarily reached before a new filling.

In any event, if at the beginning of filling, the floating arm is in the aforesaid lower limited position, the piston valve 63 will then be in closed position so that the pumped fuel cannot escape by its normal path through the transverse pipe 51. A pressure rise is created sufficient to lift the discharge valve 60 from its seat and the fuel can flow out through this valve. When the level of the liquid has risen and raised the floating arm enough to let the counterweight lever 69 rock into its normal position, the piston valve 63 will be moved back in its cylinder so as to reopen the normal path of the fuel through the floating arm out through the ends of tube 51.

When at the end of the filling operation the heel 77 of the lever 75 encounters the upper wall of the tank it slides under this wall and the lever 75 turns in a counter-clockwise direction so that its pin 76 engages and shifts the upper arm of the counterweighted lever 69 clockwise in the same direction as at the end of discharge. The piston valve 63 is moved towards its closing position shown in broken lines. When relatively to the floating arm the upper wall of the tank has the position 1B, the floats the position 16B and the lever 75 the position 75B, the plate 78 of lever 75 will have engaged the stem of the valve 62, and blocks this valve in closed position. The engagement of plate 78 with the valve stem also acts as a stop to prevent further movement of lever 75 in the counterclockwise direction. The piston valve 63 is then in closed position and as all paths for delivered liquid are closed the filling is stopped. To avoid over-pressure in the fuel conduit the pump is provided in known manner with a by-pass or discharge overflow. Also there may be provided control means operating automatically when the filling has reached a certain level.

However, if the floating arm has reached during filling its upper limited position the piston valve 63 will be held in its closed position as long as the level of the fuel remains unaltered. Discharge from the tank cannot then be effected normally, but the bypass valve 80 is lifted and opens a passage for the withdrawn liquid. When the level of the liquid has been lowered with the following floating arm the counterweighted lever 69 rocks from the position to which it has been shifted by pin 76 into its normal position; the piston valve will then be displaced in its cylinder so as to reopen for the flow of fuel into the full section of the tube 51.

Figure 7:
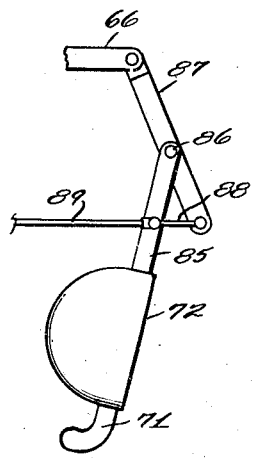
Figure 7 is a sectional view of a modified form of a member connected to the arm shown in Figure 4.

In the modified form of counterweighted lever shown in Fig. 7, this lever has two parts, one lever 85 carries the counterweight 72 and is pivoted at 86 to the middle of the lever 87 which is pivotally connected at one end to the connecting rod 66. At the other end of lever 87 and at a point of the lever 85 equally distant from the pivot 86 are attached respectively the internal cable 88 and the sheath 89 of a Bowden cable which extends from the tank, for example through the manhole 7 and is actuated from outside the tank to modify the angular spacing of these levers. Thus modification is possible of the position of the heel 71 of the counterweighted lever relatively to that of the piston valve 63 whereby the limit level of lowering of the floating arm according to the level of water in the bottom of the tank may be changed.

In the embodiment shown in Fig. 8, the head of the piston valve 63 carries a rigid axial rod 90 bent and rebent in places to provide at its end a recess bounded by two vertical walls 91, 92. Two vertical parallel levers 93, 94 extend through a slot in the upper wall of the transverse tube 51 and are pivoted in lateral sockets 95, 96 of a transverse bar 97 connecting the oscillating supports 54 and thus making the floats 16 integral so that they move as a unit. The lower ends of levers 93, 94 are positioned between the walls 91, 92 and carry oppositely disposed spaced transverse abutments 98 and 99. At the upper ends of levers 93 and 94 are attached respectively the internal cable 100 and the sheath 101 of a Bowden cable similar to that referred to in connection with Fig. 7.

In the oscillation of the floating arm, the relative oscillating movement of the assembly of floats produces a relative inclination of the two levers 93 and 94, the spacing of which is maintained by the Bowden cable. For a certain inclination of the floating arm downwardly or upwardly the abutment 98 of the lever 93 engages the wall 91, or the abutment 99 of the lever 94 engages the wall 92. Then if the floating arm continues to move in the same direction the lever 94 or the lever 93 will shift the piston valve 63 to the right or to the left, of Fig. 8. At the end of the oscillation it closes communication between the peripheral channel and the right or left end of the tube 50 as shown in Fig. 8.

Figure 4:
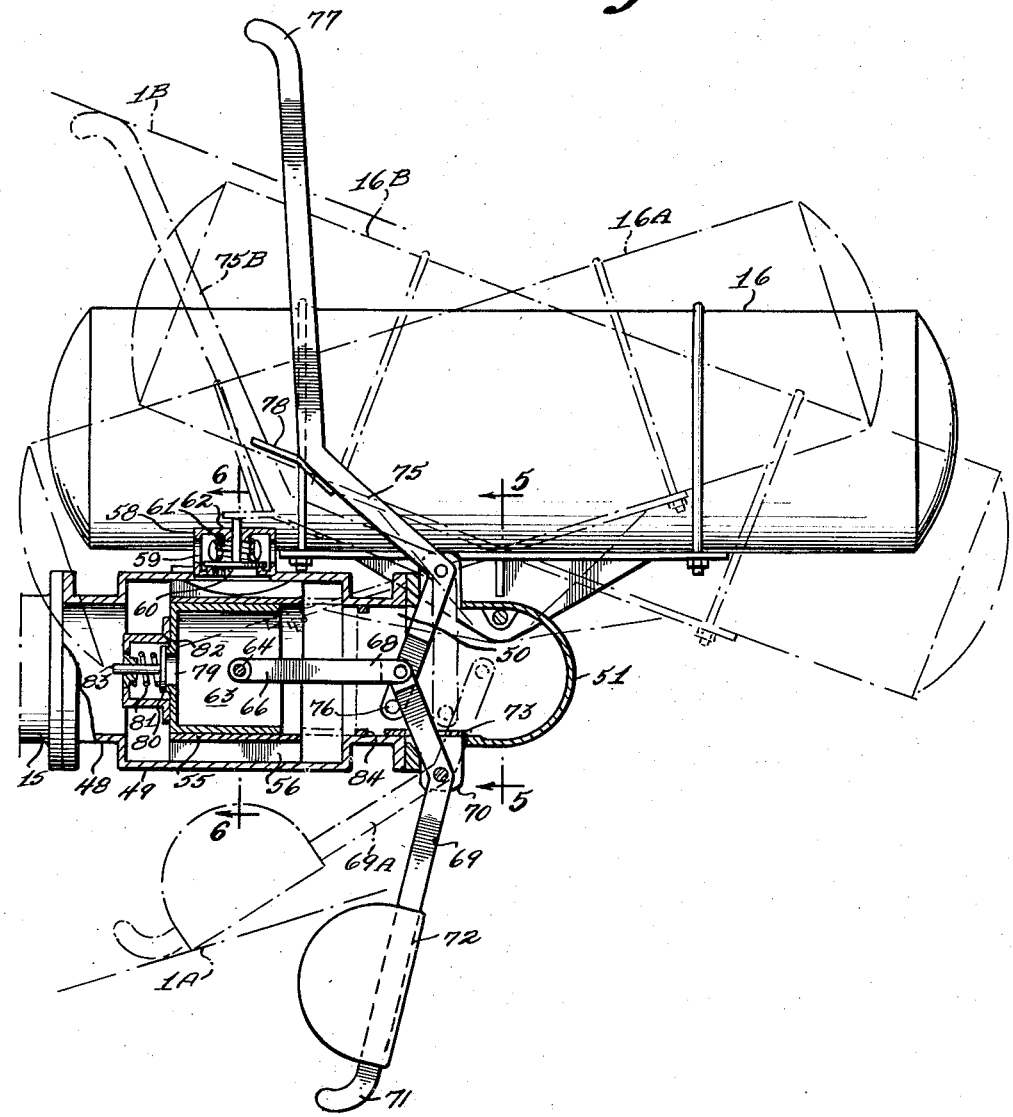
Figure 4 is a fragmentary side view partly in section of the end of the floating arm and the elements associated therewith.
Figure 5:
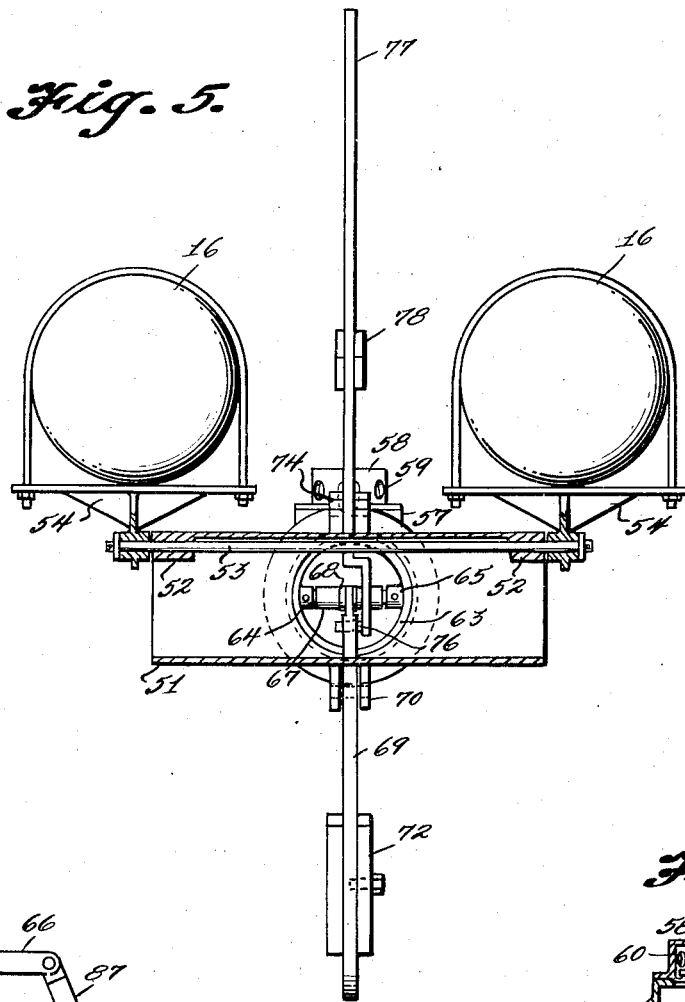
Figure 5 is a sectional view taken on line V—V of Figure 4.
Figure 6:
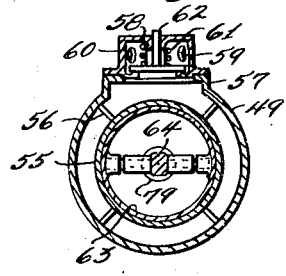
Figure 6 is a transverse section of the floating arm taken on line VI—VI of Figure 4.

Although Fig. 8 does not show a discharge valve, nor an inlet valve, such as valve 60 and 80 of Fig. 4, said valves are necessary for the reasons explained in connection with Figs. 4 to 6 and are intended to be used.

As shown in Fig. 9, the piston valve 63a may be mounted in the column 14. In such construction there is provided an intermediate tube 102 having a lateral enlargement 103 and having its section divided by a cylindrical wall 106 into a cylindrical portion 104 axially of the column and a lateral passage 105 of the same total section, there being at each end communication between the two parts of the section. The piston valve 63a is reciprocally mounted in the cylindrical portion 104, and can be moved to close one or the other of these regions of communication by an axial shifting upwards or downwards.

As in the other embodiments there are provided an inlet valve 80 in the head of the piston valve 63a and a discharge valve 60 on the wall of the tube in such a position that the port leading to this valve is closed by the piston valve 63a in its upper position. A connecting rod 107 connects the piston valve 63a to a bar 108 connecting two bosses 109 of the turning sleeves of the pivoted joint of the floating arm and in such position that they are in the plane common to the axes of pivoting of the floating arm.

The oscillation of the floating arm is accompanied therefore according to its direction by a displacement of the piston valve 63a either upwardly or downwardly. During discharge, lowering of the arm shifts the piston valve towards the bottom to a limited position for which the closure is complete. Filling may take place in this position by means of the discharge valve 60a until the rise of the fuel level and of the arm is sufficient to cause the piston valve to again uncover the communication between the upper portion of the column 14 and the arm 15. At the limit of filling the piston valve 63a which has ascended during the rise of the floating arm, closes the upper communication and the entry port of the discharge valve 60a. In this position, discharge can take place through the by-pass valve 80a until the lowering of the level of the fuel and of the arm is sufficient to make the piston valve again uncover the communication.

Having described my invention I claim:

1. A device for introducing and removing liquid into and from a tank by pumping, comprising a stationary pipe entering the tank and ending inside this tank at a level between the top and the bottom, a movable pipe pivotally connected about a horizontal axis to the end of the stationary pipe inside the tank and adapted to act as a tubular floating arm, float means secured to said tubular floating arm and arranged to hold the free end of this floating arm below and near the surface of the liquid in the tank, a slide valve having connection with one of said pipes, control means connected with one end to said valve and with the other end to the float means, and arranged for closing said valve at the highest position of the tubular floating arm and for closing said valve at the lowest position of the tubular floating arm, said tubular floating arm being provided with a by-pass section communicating with one end of this floating arm, said slide valve being reciprocably mounted in said floating arm between the ends of the by-pass section and arranged to be shifted by the control means to close one end of the by-pass section when the floating arm is in its highest position, and to close the same end of the by-pass section when the floating arm is in its lowest position.

2. A device as claimed in claim 1, in which the by-pass section is located in one of the pipes near the connection of the two pipes, and the control means includes a connecting rod connected with one end to the slide valve and with the other end to the other pipe.

3. A device as claimed in claim 1, in which the by-pass section is located in the tubular floating arm near the free end thereof, and the float means being pivotally mounted on the end of the floating arm about an axis parallel to that of the pivotal connection between the two pipes.

4. A device as claimed in claim 1, in which the slide valve means is at the free end of the floating arm and the control means includes lever arms to engage a stop at the top of the tank for closing the valve when the floating arm reaches its highest position, and to engage a stop at the bottom of the tank for closing the valve when the floating arm reaches its lowest position.

5. A device as claimed in claim 1, in which the slide valve means is arranged at the free end of the floating arm and the control means includes a lever arm pivoted about an axis carried by the floating arm and parallel to the axis of the pivotal connection between the two pipes, said lever arm having a portion arranged to engage a stop at the top of the tank and being connected to the valve for closing it when the floating arm reaches its highest position, and to engage a stop at the bottom of the tank and being connected to the valve for closing it when the floating arm reaches its lowest position.

6. A device as claimed in claim 1, in which the slide valve means is arranged at the free end of the floating arm and the control means includes two levers pivoted about an axis carried by the floating arm and parallel to the axis of the pivotal connection between the two pipes, one of said levers having a portion arranged to engage a stop at the top of the tank and being connected to the valve for closing it when the floating arm reaches its highest position, and the other of said levers having a portion arranged to engage a stop at the bottom of the tank and being connected to the valve for closing it when the floating arm reaches its lowest position.

7. A device as claimed in claim 1, in which a one-way by-pass valve is associated with the slide valve means and arranged to be opened by the liquid withdrawn from the tank when the slide valve means is closed and the floating arm is in its highest position.

8. A device as claimed in claim 1, in which a one-way discharge valve is associated with the slide valve means and arranged to be opened by the liquid entering the tank when the slide valve means is in closed position and the floating arm is in its lowest position.

9. A device according to claim 1 in which the by-pass section and slide valve are located in the fixed tube and a one-way pressure actuated discharge valve is mounted in a port in the wall of the fixed tube adjacent the upper end of the by-pass section and adapted to open when the floating arm is in its lowest position and the slide valve is in closed position, the port of the one-way discharge valve being positioned to be covered by the slide valve when the latter and the floating arm are in their uppermost positions.

10. A device according to claim 1 in which the wall of the by-pass section is provided with a port provided with a one-way pressure actuated valve operable to open when the slide valve is in one of its closed positions and the floating arm is in its lowest position, and the slide valve actuating means includes a lever having an upwardly extending arm engageable with the top of the tank and provided with a portion engageable with the stem of the pressure actuated valve when the floating arm is in its uppermost position to prevent opening of the pressure actuated valve.

11. A device according to claim 1 in which the float means comprises two elongated float elements fixed parallel to each other and symmetrically with respect to the floating arm on a common support pivotally mounted about an axis transversely of the floating arm.

References Cited in the file of this patent

UNITED STATES PATENTS

| | | |
|---|---|---|
| 502,191 | Hodgson | July 25, 1893 |
| 1,007,009 | Rothchild et al. | Oct. 24, 1911 |
| 1,069,658 | Drew | Aug. 5, 1913 |
| 1,115,791 | Drew | Nov. 3, 1914 |
| 1,621,959 | Snow | Mar. 22, 1927 |